(12) United States Patent
Tausch et al.

(10) Patent No.: US 8,302,628 B2
(45) Date of Patent: Nov. 6, 2012

(54) HANDLE SHAFT ASSEMBLIES FOR BOTTOM LOADING COUPLERS

(75) Inventors: Mark J. Tausch, West Chester, OH (US); Joseph P. Roth, Milford, OH (US)

(73) Assignee: Delaware Capital Formation, Inc., Wilmington, DE (US)

( * ) Notice: Subject to any disclaimer, the term of this patent is extended or adjusted under 35 U.S.C. 154(b) by 496 days.

(21) Appl. No.: 12/581,382

(22) Filed: Oct. 19, 2009

(65) Prior Publication Data

US 2010/0096579 A1 Apr. 22, 2010

Related U.S. Application Data

(60) Provisional application No. 61/107,288, filed on Oct. 21, 2009.

(51) Int. Cl.
*F16L 37/36* (2006.01)
(52) U.S. Cl. ............ 137/614.06; 251/214; 251/149.9; 251/232
(58) Field of Classification Search .......... 251/149.9, 251/214, 229, 232; 137/614.06; 277/370, 277/375, 526
See application file for complete search history.

(56) References Cited

U.S. PATENT DOCUMENTS

| | | | |
|---|---|---|---|
| 3,216,744 A | 11/1965 | Elbogen | |
| 3,474,827 A * | 10/1969 | Rosell | 137/614.03 |
| 3,664,634 A * | 5/1972 | Guertin | 251/333 |
| 3,897,091 A * | 7/1975 | McMath et al. | 285/311 |
| 4,102,356 A * | 7/1978 | Knight | 137/614.06 |
| 4,135,551 A * | 1/1979 | Knight et al. | 137/614.06 |
| 4,359,066 A | 11/1982 | Hunt | |
| 4,693,268 A * | 9/1987 | Fahl | 137/219 |
| 5,078,170 A | 1/1992 | Henry | |
| 5,273,071 A | 12/1993 | Oberrecht | |
| 5,628,344 A * | 5/1997 | Roberts | 137/614.06 |
| 5,671,777 A * | 9/1997 | Allen et al. | 137/614.06 |
| 6,009,901 A * | 1/2000 | Roberts | 137/614.06 |
| 6,155,294 A * | 12/2000 | Cornford et al. | 137/614 |
| 6,298,876 B1 * | 10/2001 | Bogdonoff et al. | 137/614.06 |
| 2008/0128034 A1* | 6/2008 | Fahl | 137/614.06 |

FOREIGN PATENT DOCUMENTS

EP 1 041 333 A2 4/2000

* cited by examiner

*Primary Examiner* — John K Fristoe, Jr.
*Assistant Examiner* — Matthew W Jellett
(74) *Attorney, Agent, or Firm* — Dinsmore & Shohl LLP

(57) ABSTRACT

A handle shaft assembly includes a tube spacer, a handle shaft, a stuff box, and an operational handle. The stuff box may be configured for insertion into a through-hole within a bottom loading coupler body and include first and second stuff box ends defining a cylindrical cavity. A first sealing member may be positioned on the first stuff box end, and a second sealing member positioned on the second stuff box end. The tube spacer may be configured to be positioned within a blind counterbore of the bottom loading coupler body. The handle shaft may include a first end positioned within the tube spacer configured to be positioned with a blind bore of the bottom loading coupler body, a linkage section configured to be coupled to a drive linkage of a poppet valve assembly, and a second end extending through the cylindrical cavity of the stuff box. The operational handle is mechanically coupled to the second end of the handle shaft.

20 Claims, 7 Drawing Sheets

HANDLE SHAFT ASSEMBLIES FOR BOTTOM LOADING COUPLERS

CROSS REFERENCE TO RELATED APPLICATIONS

This application claims priority to U.S. Provisional Patent Application Ser. No. 61/107,288 filed on Oct. 21, 2009 entitled Handle Shaft Assembly for Bottom Loading Coupler and is incorporated by reference herein in its entirety.

TECHNICAL FIELD

Embodiments of the present disclosure generally relate to bottom loading couplers and, more specifically to handle shaft assemblies for bottom loading couplers.

BACKGROUND

Transferring liquid product from large volume storage tanks into tank trucks or rail cars involves moving the liquid product through a fixed pipeline riser to storage containers of various sizes and orientations located in or on the tank trucks or rail cars. The various configurations of tank trucks and rail cars may require a flexible fluid transfer system such as a loading arm assembly. The loading arm assembly is a section of pipeline capable of handling high flows and line pressures that can be moved both vertically and horizontally to accommodate transport vehicles of various configurations.

One particular method of transferring liquid product through the loading arm involves using a bottom loading coupler to couple the loading arm to the storage container of the transport vehicle. The bottom loading coupler attaches to the lower portion of the vehicle storage container and, therefore, does not require personnel to climb to the top of the storage container in order to facilitate liquid transfer. The bottom loading coupler generally mates with a bottom loading adapter. A poppet valve assembly located in the body of the bottom loading coupler may be used to control the flow of liquid into the storage container. The poppet valve assembly may be actuated using a handle positioned on the outside of the body of the bottom loading coupler. The handle is generally coupled to the poppet valve assembly via a shaft which extends through a bushing positioned in a hole extending through the body of the bottom loading coupler. The bushing, which may include one or more seals, provides a bearing surface for the shaft and may seal the shaft such that gas or liquids transferred through the body of the bottom loading coupler do not leak out around the shaft. The bushing may be held in the hole with pins inserted through holes in the body tangential to the hole such that the pins contact and interfere with the outside diameter of the bushing thereby holding the bushing in place.

Because the bushings are a bearing surface, the bushings are susceptible to wear and thus are periodically replaced. Replacement of the bushing requires that the pins be removed from the body which is usually accomplished by driving the pin from its hole. Driving the pin from the hole may be a difficult operation necessitating removal of the bottom loading coupler from the loading arm assembly. Further, the driving the pin from the hole may damage the holes and or body of the bottom loading coupler thereby adversely affecting operation of the bottom loading coupler.

Accordingly, a need exists for alternative handle shaft assemblies and shaft bearing surfaces for use in bottom loading couplers.

SUMMARY

In one embodiment, a handle shaft assembly for use in a bottom loading coupler includes a tube spacer, a handle shaft, a stuff box, and an operational handle. The stuff box may be configured for insertion into a through-hole within a bottom loading coupler body and may include first and second stuff box ends defining a cylindrical cavity. A first sealing member may be positioned on or in the first stuff box end, and a second sealing member positioned on or in the second stuff box end. A first end of the tube spacer may be configured to be positioned within a blind counterbore of the bottom loading coupler body. The handle shaft may include a first end positioned within the tube spacer and configured to be positioned within a blind bore of the bottom loading coupler body, a linkage section configured to be coupled to a drive linkage of a poppet valve assembly, and a second end that extends through the cylindrical cavity of the stuff box. The operational handle may be mechanically coupled to the second end of the handle shaft for rotating the handle shaft in the stuff box.

In another embodiment, a handle shaft assembly for use in a bottom loading coupler includes a tube spacer, a handle shaft, and a stuff box. The stuff box may include first and second stuff box ends that define a cylindrical cavity, a flange portion at the first end defining a first seat having a first seal positioned therein, and an annular groove located at the second end, the annular groove having a second seal positioned therein. The stuff box may further include a threaded portion at the first end configured to mate with a corresponding threaded portion of a through-hole within a bottom loading coupler body. The handle shaft may be configured to be coupled to a poppet valve assembly and comprise a first end positioned within the tube spacer and a second end that extends through the cylindrical cavity of the stuff box.

In yet another embodiment, a bottom loading coupler includes a coupler sleeve, a coupler body, a poppet valve assembly and a handle shaft assembly. The sleeve may be slidably positioned around an outer surface of the coupler body. The poppet valve assembly may include a drive linkage and may be positioned within a cylindrical opening of the coupler body. The coupler body may include a through-hole that extends through a coupler body wall as well as a blind bore and a blind counterbore within an inner portion of the coupler body wall at a location that is opposite from the through-hole. The handle shaft assembly may include a cylindrical tube spacer having a first end positioned within the blind counterbore of the coupler body and a stuff box configured for insertion within the through-hole of the coupler body. The stuff box may include first and second stuff box ends that define a cylindrical cavity, a first sealing member positioned on the first stuff box end, and a second sealing member positioned on the second stuff box end. The handle shaft assembly may further include a handle shaft and an operational handle. The handle shaft may include a first end positioned within the tube spacer and the blind bore, a linkage section positioned within a slot of a drive linkage of a poppet valve assembly, and a second end that extends through the cylindrical cavity of the stuff box. The operational handle may be mechanically coupled to the second end of the handle shaft for rotation of the handle shaft in the stuff box.

These and additional features provided by the embodiments of the present invention will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION

Embodiments of the present disclosure are generally related to handle shaft assemblies for use with bottom loading couplers. Embodiments provided herein may prevent fuel from leaking out of a bottom loading coupler around the handle shaft. Further, embodiments described herein may reduce the amount of wear experienced by the handle shaft assembly, as well as eliminate the need for the removal of pins to perform coupler maintenance, such as cleaning or replacing seals within the handle shaft assembly.

Figure 1:
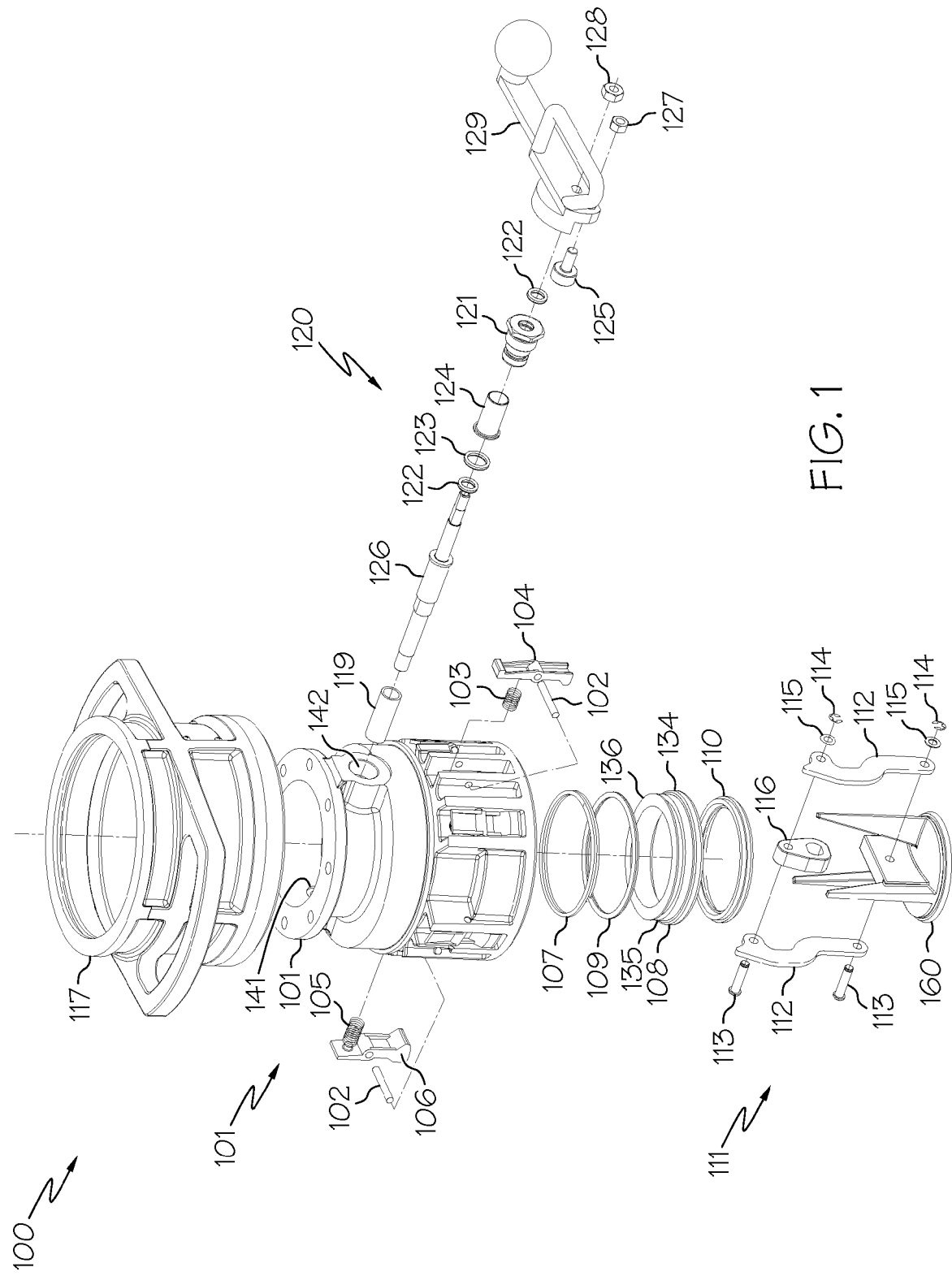
FIG. 1 depicts an exploded view of a bottom loading coupler according to one or more embodiments shown and described herein.

FIG. 1 generally depicts an exploded view of a bottom loading coupler. The bottom loading coupler generally comprises a body having a poppet valve assembly disposed therein. The poppet valve assembly is actuated by a handle shaft assembly comprising a tube spacer, a handle shaft, a stuff box, a sleeve bearing, a cam follower, and an operational handle. The bottom loading coupler, the handle shaft assembly and the stuff box will be described in more detail herein with specific reference to the figures.

Referring to FIG. 1, an exploded view of one embodiment of a bottom loading coupler 100 is illustrated. The bottom loading coupler 100 generally comprises a coupler body 101 having a poppet valve assembly 111 disposed within a cylindrical cavity formed by the body 101. Although the exemplary body 101 illustrated in the figures is substantially cylindrical, it should be understood that the body 101 may have other shapes or configurations. An outer coupler sleeve 117 is disposed around the body 101 and is configured to rotate cams 106 that lock the bottom loading coupler 100 to a bottom loading adapter (not shown). The body 101 and the coupler sleeve 117 may be made of a metallic material, such as cast anodized aluminum, for example. Other materials for the body 101 and coupler sleeve 117 may also be utilized.

Figure 2B:
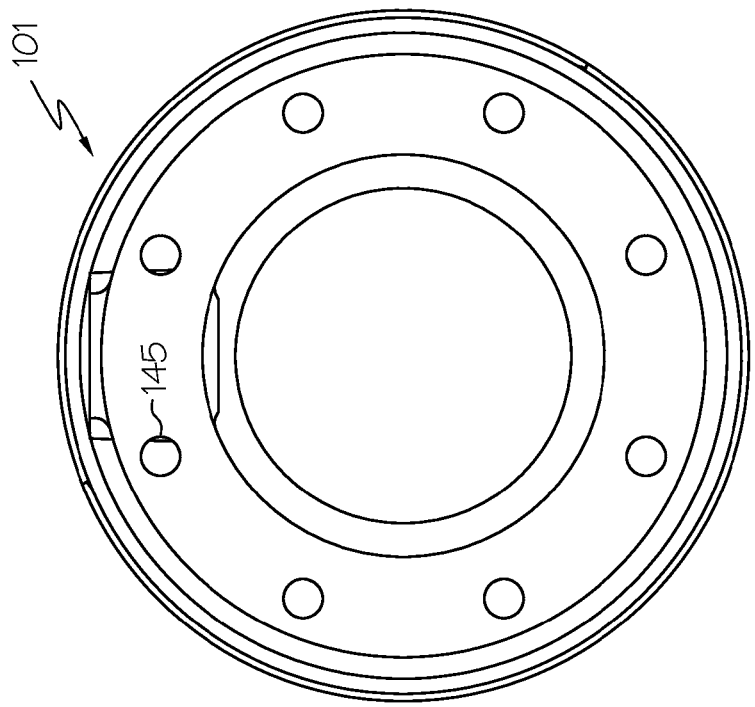
FIGS. 2A and 2B depict a body of a bottom loading coupler according to one or more embodiments shown and described herein.
Figure 2A:
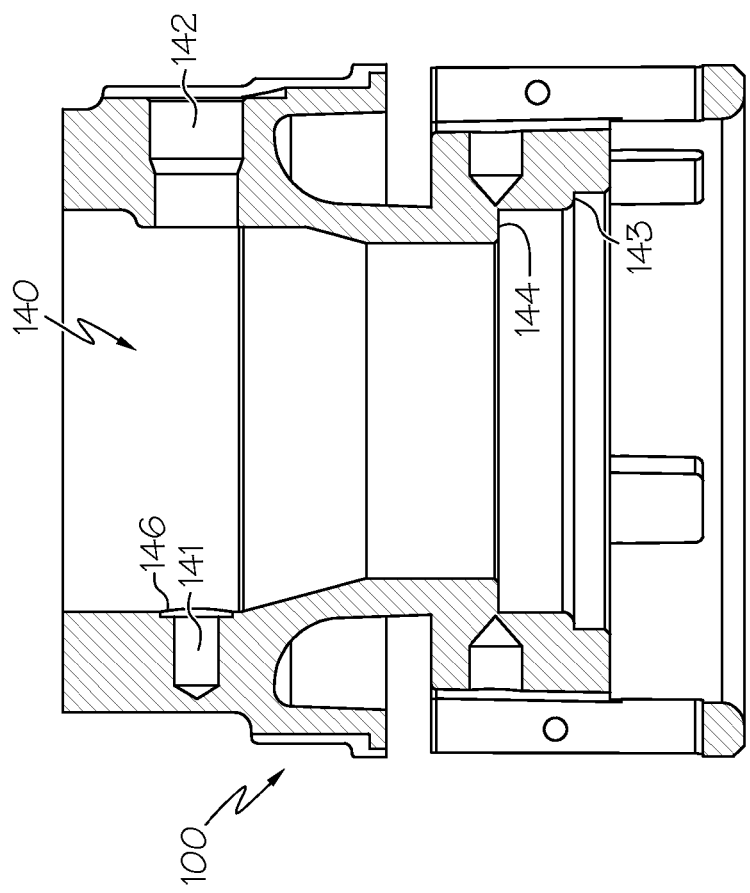

Referring now to FIGS. 1, 2A and 2B, the body 101 defines an inner cylindrical cavity 140 in which the poppet valve assembly 111 and handle shaft assembly 120 may be positioned. As illustrated in FIG. 2A, two circumferential seats 143, 144 may be provided within an inner portion of the body 101 that are configured to provide a resting and sealing surface for the poppet valve assembly 111 and related components. When the bottom loading coupler 100 is in a closed position, the poppet valve assembly 111 may prevent a flow of liquid through the bottom loading coupler 100.

At least two pivoting interlocks (e.g., pivot interlock 104) may be disposed in an outer wall of the body 101 by a pin 102 and a spring 103. The interlocks 104, each of which may be positioned in a channel formed in the outer wall of the body as illustrated in FIG. 1, may allow for the coupler sleeve 117 to be moved in a direction away from the poppet valve assembly 111 when the bottom loading coupler 100 is engaged with a liquid storage or transport container (e.g., via a bottom loading adapter (not shown)). As described in more detail below, sliding the coupler sleeve 117 in a direction toward the poppet valve assembly 111 allows for the operational handle 129 to be rotated in a direction that opens the poppet valve assembly 111 and places the bottom loading coupler in an open position. The interlocks 104 prevent the bottom loading coupler 100 from assuming an open position when the coupler is not engaged with a liquid storage or transport container (or other similar device) by not allowing the coupler sleeve 117 to slide into an open position, which also prevents the rotation of the operational handle 129. A plurality of cams (e.g., cam 106) may also be pivotally maintained by a pin 102 and a spring 105 within channels positioned around an outer wall of the body 101. The cams 106 may be configured to facilitate engaging the bottom loading coupler 100 with the bottom loading adapter or another device used to couple the bottom loading coupler 100 to a liquid storage or transport container device.

The body 101 may also comprise a blind bore 141 and a corresponding blind counterbore 146 within a body inner surface. The body 101 may further comprise a through-hole 142 that is opposite from the blind bore 141 and blind counterbore 146. The blind bore 141, blind counterbore and through-hole 142 may be formed in the body 101 during a casting operation or machined during a machining operation. As described in more detail below, the blind bore 141, blind counterbore and through-hole 142 may be configured to receive and maintain the handle shaft assembly 120. The body may also comprise a plurality of coupling holes 145 to couple the bottom loading coupler 100 to a fuel loading arm by fasteners such as nuts and bolts, for example.

Referring now to FIGS. 1-3B, one embodiment of the poppet valve assembly 111 may comprise a poppet 160, a nose seal 110, a valve cylinder 108, a cylinder O-ring 109, and a wave spring 107. It may also comprise a drive linkage 116 and one or more links 112. Poppet valve assemblies of other embodiments may have more or fewer components than those illustrated in FIG. 1. In the illustrated embodiment, the poppet 160 comprises a flat surface 161 that is configured to be positioned within the nose seal 110. The valve cylinder 108 comprises an inner circumferential seat (not shown) within a first end 134 upon which the nose seal 110 may be seated. The first end 134 also comprises a circumferential flange. The cylinder O-ring 109 may be positioned around the valve cylinder 108 within a circumferential groove 135 located at a second end 136 of the valve cylinder 108. The wave spring 107 may be positioned between the second end 136 of the valve cylinder 108 and circumferential seat 144 of the body 101. The flange of the valve cylinder 108 may be seated within circumferential seat 143 (FIG. 2A).

Figure 3B:
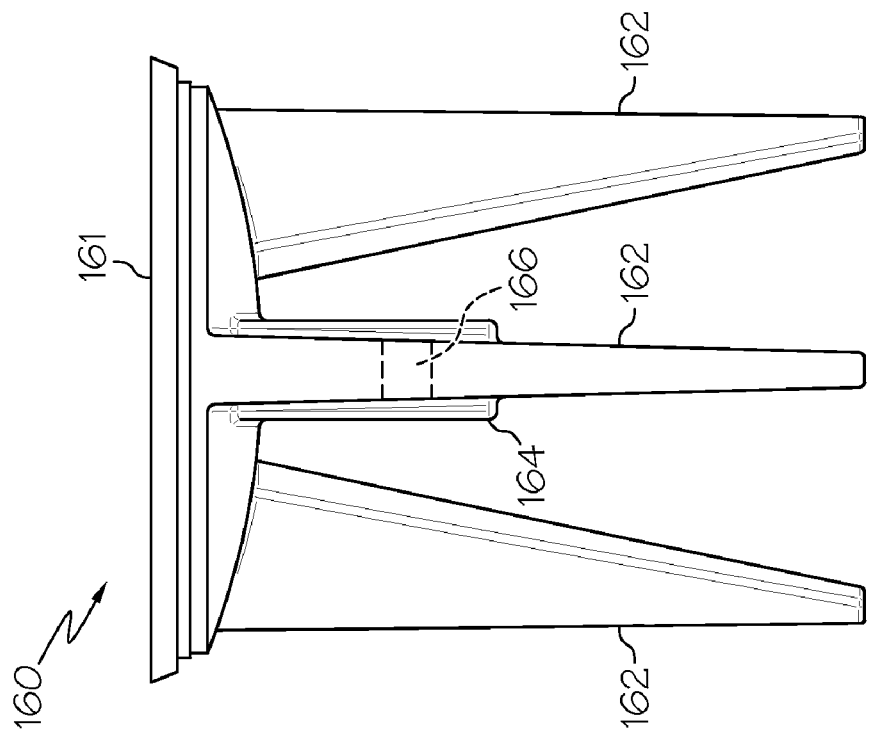
FIGS. 3A and 3B depict a poppet valve of a bottom loading coupler shown in FIG. 1 according to one or more embodiments shown and described herein.
Figure 3A:
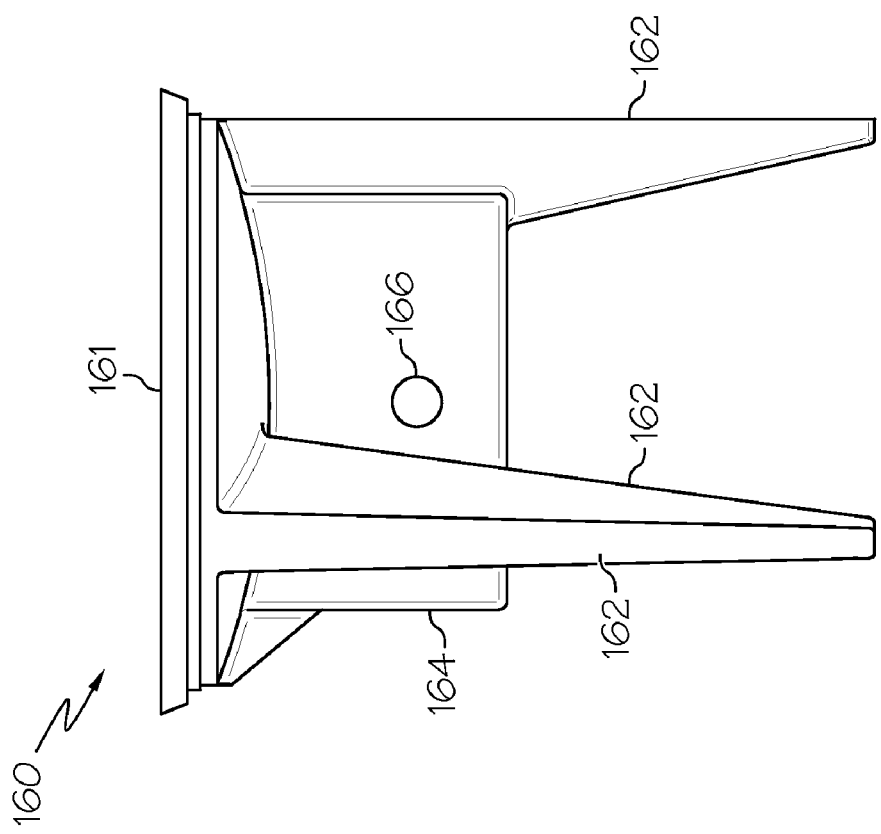
Figure 4:
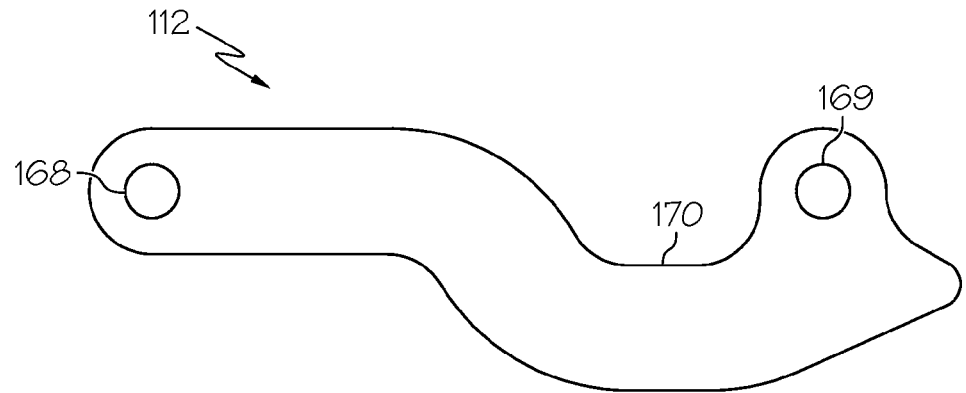
FIG. 4 depicts a high pressure link configured to be coupled to a poppet valve assembly and a drive linkage of a bottom loading coupler according to one or more embodiments shown and described herein.
Figure 5:
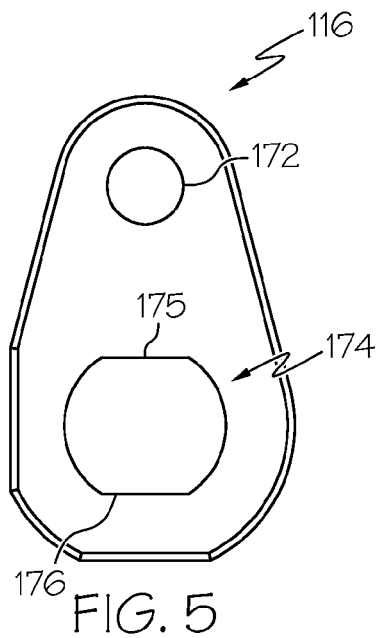
FIG. 5 depicts a drive linkage configured to be coupled to a poppet valve assembly of a bottom loading coupler according to one or more embodiments shown and described herein.

As illustrated in FIGS. 3A and 3B, the poppet 160 may comprises a plurality of arms 162 that extend from the flat surface 161. When assembled, the arms 162 are positioned in the cylindrical cavity 140 of the body 101 and may contact an inner bore of the valve cylinder 108 to provide guidance to the poppet 160. The poppet 160 may also have a vertical coupling plate 164 that includes a pin hole 166 for accepting a coupling pin 113 (e.g., a clevis pin) to couple two links 112 to the poppet 160 as illustrated in FIG. 1. As illustrated in FIGS. 1 and 4, the coupling pin 113 may be positioned through first link hole 168 at a first end of each link 112 as well as the pin hole 166 within the vertical coupling plate 164. The coupling pin 113 may be maintained within first link holes 168 and pin hole 166 by a washer 115 and an E-ring 114. The links 112 may comprise a curved portion 170 that allows for the handle shaft 126 to pass across the cylindrical cavity 140 of the body 101. The second end of each link 112 may then be coupled to the drive linkage 116 (FIG. 5). The drive linkage 116 comprises a drive linkage pin hole 172 for accepting a coupling pin 113 (e.g., a clevis pin). The coupling pin 113 may be inserted into a second link hole 169 of each link 112 as well a drive linkage pin hole 172. The coupling pin may be maintained within the second link holes 169 and drive linkage pin hole 172 by a washer 115 and E-ring 114 as illustrated in FIG. 1. However, it should be understood that the links 112 may be coupled to the poppet 160 and drive linkage 116 by any known or yet to be developed fasteners.

Figure 6:
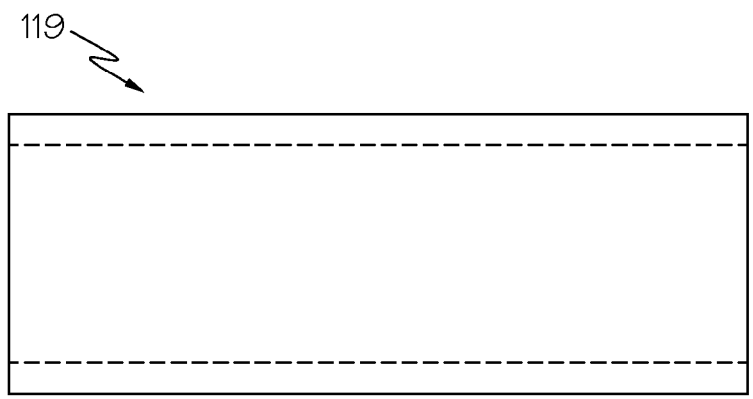
FIG. 6 depicts a tube spacer of a handle shaft assembly of a bottom loading coupler according to one or more embodiments shown and described herein.
Figure 7A:
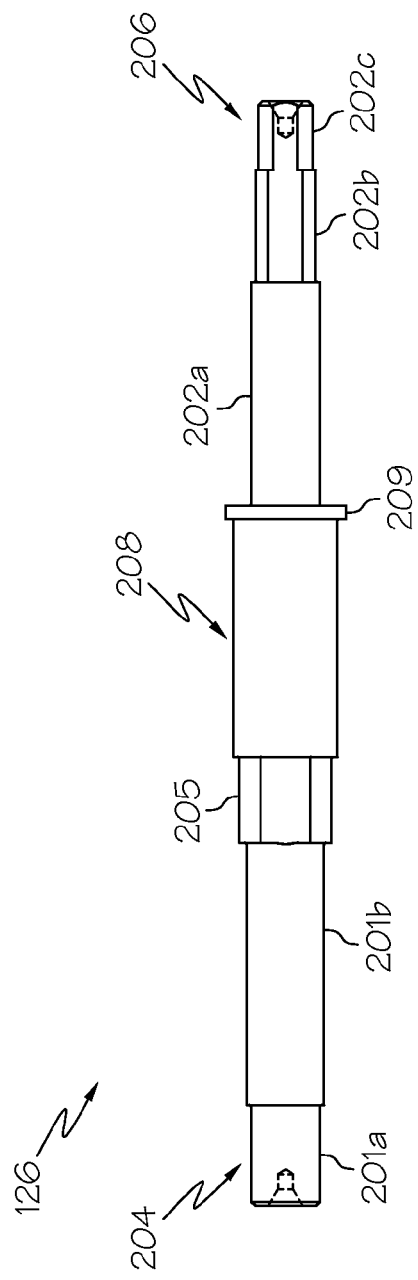
FIGS. 7A and 7B depict a handle shaft of a handle shaft assembly of a bottom loading coupler according to one or more embodiments shown and described herein.
Figure 7B:
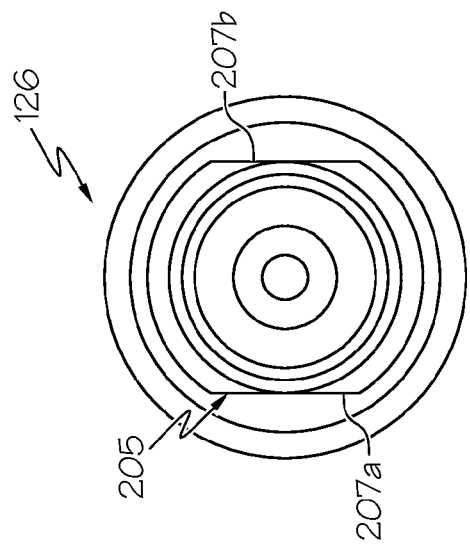

Referring now to FIGS. 1, 6-10, the various components of one embodiment of the handle shaft assembly 120 of the bottom loading coupler are illustrated. The handle shaft assembly 120 generally comprises a tube spacer 119, a handle shaft 126, a sleeve bearing 124, a stuff box 121, at least one internal sealing member 122, at least one external sealing member 123, an operational handle 129 and a cam follower 125. As illustrated in FIGS. 1 and 6, the tube spacer 119 generally comprises a hollow cylindrical shaft configured to accept the handle shaft 126. Referring specifically to FIGS. 7A and 7B, the handle shaft 126 generally comprises a solid shaft extending between a first end 204 and a second end 206. The first end 204 comprises a first cylindrical portion 201a and a second cylindrical portion 201b. The diameter of the first cylindrical portion 201a is smaller than the diameter of the second cylindrical portion 201b, and the first cylindrical portion 201a is configured/sized for insertion into blind bore 141. As described in more detail below, the second cylindrical portion 201b may be disposed within the tube spacer 119.

The second end 206 generally comprises first, second and third cylindrical portions 202a-202c. The first cylindrical portion 202a of the second end 206 is disposed within the sleeve bearing 124, the stuff box 121 and the through-hole 142 of the body 101. As described below, the second cylindrical portion 202b of the second end 206 is disposed within the operational handle 129, and the third cylindrical portion 202c of the second end 206 may be threaded such that the handle shaft 126 may be secured to the operational handle 129 by a fastener such as a nut 128, for example.

Disposed between the first end 204 and the second end 206 may be a linkage section 205 having opposing planar surfaces 207a and 207b for engaging with a corresponding drive linkage slot 174 of the drive linkage 116 with opposing planar surface 175 and 176. The opposing planar surfaces 207a and 207b may prevent rotation of the handle shaft 126 with respect to the drive linkage 116 when the handle shaft 126 is inserted in the drive linkage slot 174. This configuration may eliminate the need for a pin or a screw or other fastener to maintain the handle shaft 126 within the drive linkage slot 174. Other geometric configurations that prevent the rotation of the handle shaft 126 with respect to the drive linkage 116 may also be utilized. The handle shaft 126 also includes an expanded cylindrical section 208 between the linkage section 205 and the second end 206 that comprises a collar 209 for seating the handle shaft 126 in the through-hole 142 of the body 101 of the bottom loading coupler 100. The diameter of the expanded cylindrical section 208 and the tube spacer 119 are such that the drive linkage 116 is maintained between the expanded cylindrical section 208 and the tube spacer 119 upon assembly.

Figure 8B:
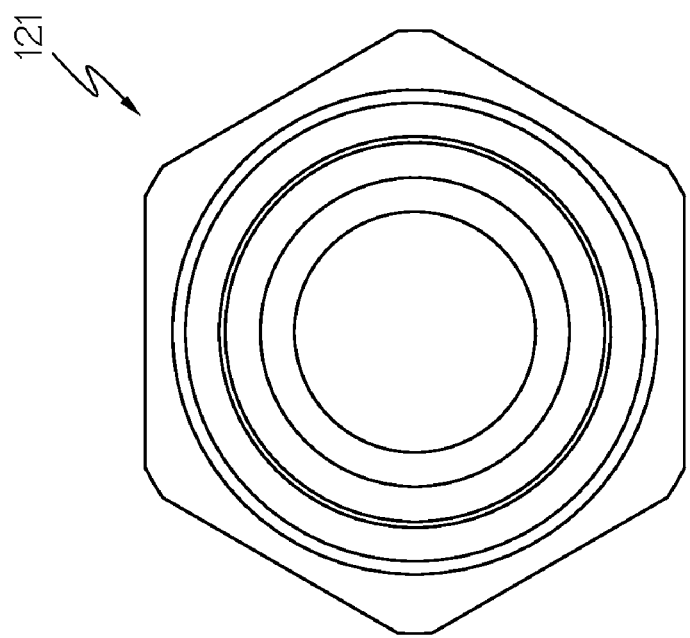
FIGS. 8A and 8B depict a stuff box of a handle shaft assembly of a bottom loading coupler according to one or more embodiments shown and described herein.
Figure 8A:
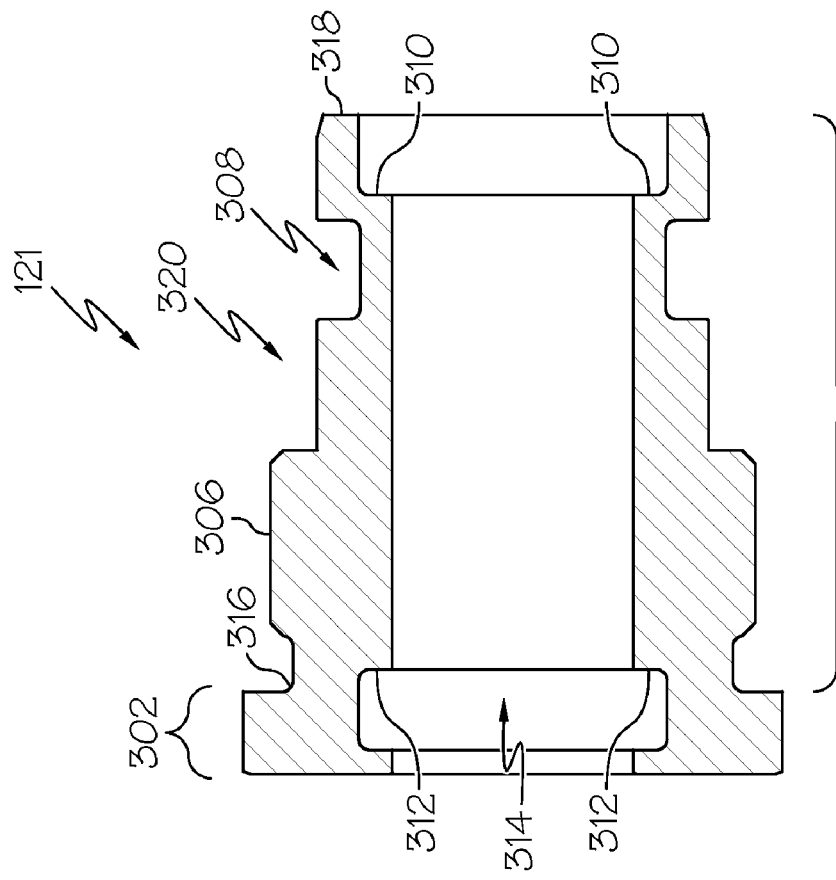

FIGS. 8A and 8B depict one embodiment of a stuff box 121 shown in axial cross section and from a top view, respectively. The stuff box 121 generally comprises a body portion 304 and a flanged portion 302, and may be made of a metallic material, such as stainless steel, for example. The body portion 304 may be substantially circular in radial cross section and extend between a first end 316 and a second end 318 defining a cylindrical cavity 314. The body portion 304 may comprise an exterior surface 320. In one embodiment, as shown in FIG. 8A, at least a portion 306 of the exterior surface 320 of the body portion 304 may comprise threads such that the stuff box 121 may be threaded into the body 101 of the bottom loading coupler, as will be described further herein below. The exterior surface 320 may be formed with an annular groove 308 for receiving an external sealing member 123 (i.e., a second sealing member) which seals the body portion 304 of the stuff box 121 to the body 101 of the bottom loading coupler 100 when the stuff box 121 is threaded into the bottom loading coupler 100. In one embodiment, the second end 318 of the body portion 304 is formed with an annular seat 310 in which an internal sealing member 122 (i.e., a third sealing member) may be disposed. The internal sealing member 122 may form a seal between the handle shaft 126 and the cylindrical cavity 314 of the stuff box 121 when the handle shaft 126 is positioned in the cylindrical cavity 314.

The flanged portion 302 is joined to the body portion 304 at the first end 316 of the body portion 304. In one embodiment, the flanged portion 302 is integrally formed with the body portion 304 while, in another embodiment, the flanged portion 302 is attached to the body portion 304 such as by welding or the like. As shown in FIG. 8B, the flanged portion 302 may be hexagonally shaped thereby facilitating the use of standard tooling to extract or insert the stuff box 121 into the body 101 of the bottom loading coupler 100. However, it should be understood that the flanged portion 302 may be constructed to correspond to the general shape of any known or yet to be developed fastener systems. The flanged portion 302 may be formed with an annular seat 312 in which an internal sealing member 122 (i.e., a first sealing member) may be disposed. The internal sealing member 122 may form a seal between the handle shaft 126 and the cylindrical cavity 314 of the stuff box 121 when the handle shaft 126 is positioned in the cylindrical cavity 314.

Figure 9A:
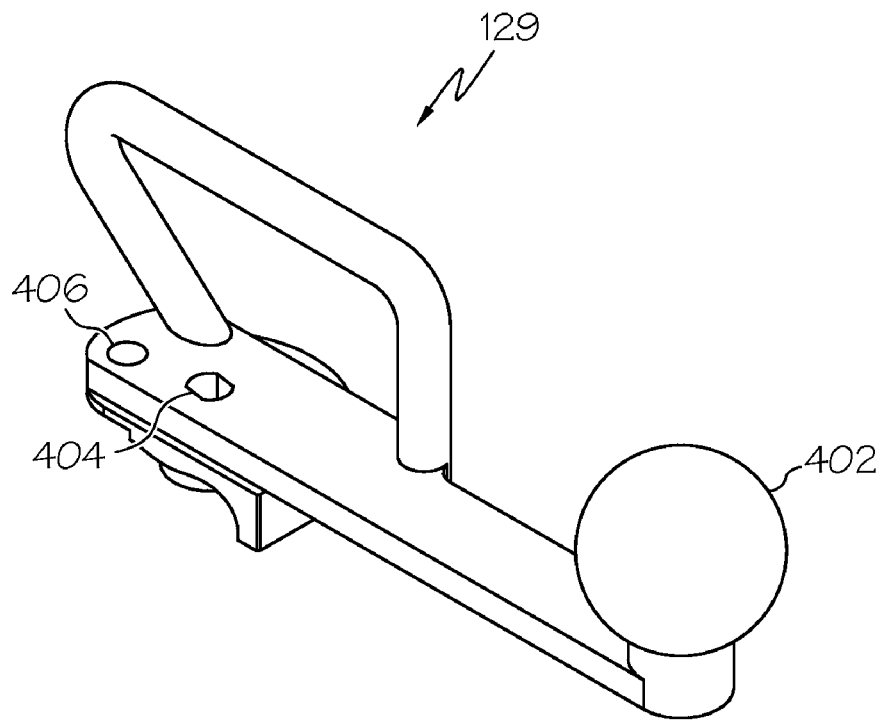
FIGS. 9A-9B depict an operational handle of a handle shaft assembly of a bottom loading coupler according to one or more embodiments shown and described herein.
Figure 9B:
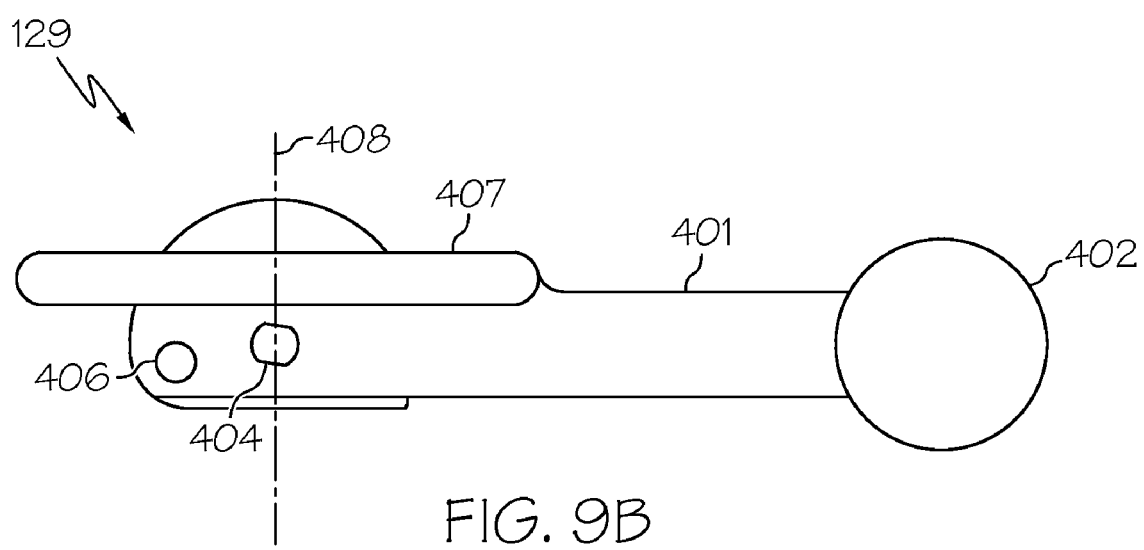

Referring to FIGS. 1 and 9A-9B, the operational handle 129 may comprise an operating knob 402 radially disposed from the axis of rotation 408 of the operational handle 129. The operational handle 129 generally comprises a hole 404 configured to receive the second end 206 of the handle shaft 120. The operational handle 129 also comprises a hole 406 for receiving the shaft portion of the cam follower 125.

Referring to FIGS. 1-9B, the assembly of the handle shaft assembly 120 into a bottom loading coupler 100 will now be described. The handle shaft 126 is disposed in a through-hole 142 in the body 101 of the bottom loading coupler 100. The first end 204 of the handle shaft 126, specifically the opposed planar surfaces numbers of the linkage section 205, are engaged with the drive linkage slot 174 of the drive linkage 116 of the poppet valve assembly 111 positioned in the interior of the body 101. The tube spacer 119 is inserted on the handle shaft 126 such that the drive linkage 116 is disposed on the handle shaft 126 between a second end of the tube spacer 119 and a first end of the expanded cylindrical portion 208 of the handle shaft 126. Once the tube spacer 119 is positioned on the handle shaft 126, the handle shaft 126 is fully seated in the through-hole 142 in the body 101 such that the collar 209 of the expanded cylindrical portion 208 is positioned on a shoulder formed in the through-hole 142. In this position, a first end of the tube spacer 119 is disposed within the blind counterbore 146 and the first cylindrical portion 201a is positioned within the blind bore 141 opposite the through-hole 142 (see FIG. 2).

During assembly, the internal sealing members 122 are positioned in the seats 310, 312 of the stuff box 121. The external sealing member 123 is positioned in the annular groove 308 on the exterior surface 320 of the body portion 304 of the stuff box 121. The sleeve bearing is inserted over the second end of the handle shaft 126. The stuff box 121 is then inserted over the second end 306 of the handle shaft 126 such that the handle shaft 126 is disposed in the cylindrical cavity 314. The stuff box 121 is then threaded into the through-hole 142 in the body 101 such that the threads 306 of the stuff box 121 are engaged with the corresponding threads in the interior of the hole. The cam follower 125 is inserted into hole 406 in the operational handle and secured with a nut 127. The operational handle 129 is then positioned on the second end 206 of the handle shaft 126 such that the handle shaft 126 is engaged with hole 404. The operational handle 129 is then secured to the second end 206 of the handle shaft with a threaded fastener such as a nut 128.

The operation of the bottom loading coupler 100 will now be described. The bottom loading coupler 100 is attached to a loading arm (not shown) via the coupling holes 145 of the body 101. Fasteners such as nuts and bolts may be utilized to attach the bottom loading coupler 100 to the loading arm. Next, a bottom loading adapter (not shown) that is connected to a liquid storage tank or other device is engaged with the cylindrical cavity 140 of the bottom loading coupler 100, which defeats the interlocks 104 and enables the coupler sleeve 117 to be slid toward the bottom loading adapter. The cams 106 engage a circumferential surface of the bottom loading adapter. Because the coupler sleeve 117 is now moved toward the bottom loading adapter, the operational handle 129 is no longer encumbered from rotation by the sleeve 117. In other words, the operational handle 129 now has enough clearance to be rotated.

The operational handle 129 may be used to actuate the poppet valve assembly 111 of the bottom loading coupler 100. More specifically, the operational handle 129 may be rotated using operating knob 402. The rotational motion of the operational handle 129 is imparted to the handle shaft 126 and communicated to the drive linkage 116 thereby rotating the drive linkage 116. When the handle shaft 126 and drive linkage 116 are rotated in a first direction, motion of the drive linkage 116 pushes the poppet valve assembly 111 open such that the flat surface 161 of the poppet 160 is no longer in contact with the nose seal 110 seated within the valve cylinder 108. When the handle shaft 126 and drive linkage 116 are rotated in a second, opposite direction, the motion of the drive linkage 116 pulls the poppet valve assembly closed such that the flat surface 161 of the poppet 160 contacts the nose seal 110, thereby preventing the flow of liquid.

As the handle shaft 126 is rotated in the stuff box 121, the internal sealing members 122 maintain a seal between the handle shaft 126 and the stuff box 121. Similarly the external sealing member 123 seals the stuff box 121 to the body 101. Accordingly, liquid and/or gases flowing through the bottom loading coupler cannot escape through or around the handle assembly.

While the figures and other information submitted herewith may contain specific reference to size and material specifications, it should be understood that these references are illustrative of one or more embodiments and that the size of various component parts may be scaled up or down and the material specifications adjusted to cover various other additional embodiments while still retaining the same functionality of the bottom loading coupler, handle shaft assembly and stuff box described herein.

While particular embodiments and aspects of the present invention have been illustrated and described herein, various other changes and modifications can be made without departing from the spirit and scope of the invention. Moreover, although various inventive aspects have been described herein, such aspects need not be utilized in combination. It is therefore intended that the appended claims cover all such changes and modifications that are within the scope of this invention.

What is claimed is:

1. A handle shaft assembly for use in a bottom loading coupler, the handle shaft assembly comprising a tube spacer, a handle shaft, a stuff box, and an operational handle, wherein:
   the stuff box is configured for insertion into a through-hole within a bottom loading coupler body and comprises first and second stuff box ends defining a cylindrical cavity therebetween, a first sealing member positioned on or in the first stuff box end, and a second sealing member positioned on or in the second stuff box end;
   a first end of the tube spacer is configured to be positioned within a blind counterbore of the bottom loading coupler body;
   the handle shaft comprises a first end positioned within the tube spacer configured to be positioned with a blind bore of the bottom loading coupler body that extends from the blind counterbore of the bottom loading coupler body, the blind counterbore and the blind bore positioned outside of an inner cylindrical cavity of the bottom loading coupler body, a linkage section configured to be coupled to a drive linkage of a poppet valve assembly, and a second end that extends through the cylindrical cavity of the stuff box; and
   the operational handle is mechanically coupled to the second end of the handle shaft for rotating the handle shaft in the stuff box.

2. The handle shaft assembly of claim 1 wherein:
   the stuff box further comprises a flange portion at the first end defining a first seat, a threaded portion at the first end configured to mate with a corresponding threaded portion of the through-hole, and an annular groove located at the second end; and
   the first sealing member is positioned within the first seat and the second sealing member is positioned within the annular groove.

3. The handle shaft assembly of claim 2 wherein the stuff box further comprises a second seat formed within the second end and a third sealing member is positioned within the second seat.

4. The handle shaft assembly of claim 2 wherein the flange portion of the stuff box is hexagonally shaped.

5. The handle shaft assembly of claim 2 wherein the flange portion of the stuff box is configured to rest on an outer surface of the through-hole.

6. The handle shaft assembly of claim 1 wherein:
the handle shaft further comprises a cylindrical portion adjacent to the linkage section;
the cylindrical portion comprises a diameter that is greater than a thickness of the linkage section; and
a first end of the cylindrical portion is configured to be positioned against a first surface of the drive linkage.

7. The handle shaft assembly of claim 6 wherein the cylindrical portion comprises a collar located at a second end, and the collar is configured to provide an abutment surface for the second end of the stuff box.

8. The handle shaft assembly of claim 1 wherein the tube spacer comprises a cylindrical shape having a second end that is configured to be positioned against a second surface of the drive linkage.

9. The handle shaft assembly of claim 1 wherein:
the handle shaft further comprises a cylindrical portion adjacent to the linkage section, the cylindrical portion having a diameter that is greater than a thickness of the linkage section;
the tube spacer comprises a cylindrical shape having a second end; and
a first end of the cylindrical portion is configured to be positioned against a first surface of the drive linkage, and the second end of the tube spacer is configured to be positioned against a second surface of the drive linkage such that lateral movement of the drive linkage along the handle shaft is substantially prevented upon insertion of the handle shaft into the drive linkage and the tube spacer.

10. The handle shaft assembly of claim 1 wherein the handle shaft is substantially free from rotation with respect to the drive linkage when the linkage section of the handle shaft is positioned within a drive linkage slot of the drive linkage.

11. The handle shaft assembly of claim 1 wherein the linkage section and a drive linkage slot of the drive linkage have a cross sectional geometry that substantially prevents the handle shaft from rotating within the drive linkage when the linkage section of the handle shaft is positioned within the drive linkage slot.

12. The handle shaft assembly of claim 11 wherein the cross sectional geometry comprises first and second opposing planar surfaces.

13. A handle shaft assembly for use in a bottom loading coupler, the handle shaft assembly comprising a tube spacer, a handle shaft and a stuff box, wherein:
the stuff box comprises:
first and second stuff box ends defining a cylindrical cavity therebetween;
a flange portion at the first end defining a first seat having a first sealing member positioned therein;
an annular groove located at the second end, the annular groove having a second sealing member positioned therein; and
a threaded portion at the first end configured to mate with a corresponding threaded portion of a through-hole within a bottom loading coupler body;
a first end of the tube spacer is configured to be positioned within a blind counterbore of the bottom loading coupler body and the first end of the handle shaft is configured to be positioned within a blind bore of the coupler body that extends from the blind counterbore of bottom loading coupler body, wherein the blind counterbore and the blind bore are positioned outside of an inner cylindrical cavity of the bottom loading coupler body; and
the handle shaft is configured to be coupled to a poppet valve assembly and comprises a first end positioned within the tube spacer and a second end that extends through the cylindrical cavity of the stuff box.

14. The handle shaft assembly of claim 13 wherein a first end of the tube spacer is configured to be positioned within a blind counterbore of the bottom loading coupler body and the first end of the handle shaft is configured to be positioned within a blind bore of the bottom loading coupler body.

15. The handle shaft assembly of claim 13 wherein the stuff box further comprises a second seat formed within a distal portion of the second end, the second seat having a third sealing member positioned therein.

16. The handle shaft assembly of claim 13 wherein the handle shaft assembly further comprises an operational handle that is mechanically coupled to the second end of the handle shaft such that rotation of the operational handle in a first direction opens the poppet valve assembly and rotation of the operational handle in a second direction closes the poppet valve assembly.

17. The handle shaft assembly of claim 13 wherein:
the handle shaft further comprises a linkage section configured to be positioned within a slot of a drive linkage of the poppet valve assembly and a cylindrical portion adjacent to the linkage section, the cylindrical portion having a diameter that is greater than a thickness of the linkage section;
the tube spacer comprises a cylindrical shape having a second end; and
a first end of the cylindrical portion is configured to be positioned against a first surface of the drive linkage, and the second end of the tube spacer is configured to be positioned against a second surface of the drive linkage such that lateral movement of the drive linkage along the handle shaft is substantially prevented upon insertion of the handle shaft into the drive linkage and the tube spacer.

18. A bottom loading coupler comprising a coupler sleeve, a coupler body, a poppet valve assembly and a handle shaft assembly, wherein:
the coupler sleeve is slidably positioned around an outer surface of the coupler body;
the poppet valve assembly comprises a drive linkage and is positioned within an inner cylindrical cavity of the coupler body;
the coupler body comprises a through-hole that extends through a coupler body wall, a blind bore, and a blind counterbore;
the blind bore and the blind counterbore are located within an inner portion of the coupler body wall at a location opposite the through-hole outside of the inner cylindrical cavity of the coupler body, wherein the blind bore extends from the blind counterbore; and
the handle shaft assembly comprises:
a tube spacer having a first end positioned within the blind counterbore of the coupler body;
a stuff box configured for insertion within the through-hole of the coupler body, the stuff box comprising first and second stuff box ends defining a cylindrical cavity therebetween, a first sealing member positioned on the first stuff box end, and a second sealing member positioned on the second stuff box end;
a handle shaft comprising a first end positioned within the tube spacer and the blind bore, a linkage section positioned within a slot of the drive linkage of the poppet valve assembly, and a second end that extends through the cylindrical cavity of the stuff box; and an operational handle mechanically coupled to the second end of the handle shaft for rotating the handle shaft in the stuff box.

19. The bottom loading coupler of claim 18 wherein:

the stuff box further comprises flange portion at the first end defining a first seat, an annular groove located at the second end, a second seat formed within a distal portion of the second end, and a threaded portion at the first end configured to mate with a corresponding threaded portion of the through-hole; and the first sealing member is positioned within the first seat, the second sealing member is positioned within the annular groove, and a third sealing member is positioned within the second seat.

20. The bottom loading coupler of claim 18 wherein:

the handle shaft further comprises a cylindrical portion adjacent to the linkage section, the cylindrical portion having a diameter that is greater than a thickness of the linkage section;

the tube spacer comprises a cylindrical shape having a second end; and a first end of the cylindrical portion is configured to be positioned against a first surface of the drive linkage, and the second end of the tube spacer is configured to be positioned against a second surface of the drive linkage such that lateral movement of the drive linkage along the handle shaft is substantially prevented upon insertion of the handle shaft into the drive linkage and the tube spacer.

* * * * *